Patented Sept. 17, 1940

2,215,038

UNITED STATES PATENT OFFICE 2,215,038

AMINOHYDROXY COMPOUNDS AND DERIVATIVES AND PROCESS OF MAKING THE SAME

Theodore S. Hodgins, Royal Oak, and Almon G. Hovey, Pleasant Ridge, Mich., assignors to Reichhold Chemicals, Inc., formerly Beck, Koller & Company, Inc., Detroit, Mich.

No Drawing. Application April 29, 1939, Serial No. 270,864

4 Claims. (Cl. 260—307)

In its broadest aspects the present invention relates to the discovery of certain valuable attributes of various nitroparaffin derivatives, particularly the aminohydroxy compounds such as amino alcohols, and their derivatives such as urethanes, both simple and cyclic, and to their utilization as wetting agents, emulsifying agents, dispersing agents, plasticizing agents, and as ingredients of synthetic resins such as the alkyd-resins, and for other purposes. The invention also relates to improvements in the production of urethanes, both simple and cyclic, from aminohydroxy compounds, and more particularly from amino alcohols.

The claims of the present application are directed specifically to the production of urethanes both simple and cyclic by reacting 2-amino-2-methyl-1,3-propanediol with diethyl carbonate. These urethanes are useful as anti-oxidants, anti-skinning agents, resin-forming ingredients and for other purposes.

Various types of aminohydroxy compounds may be employed in accordance with our invention. For example, very satisfactory results have been obtained by the use, as starting materials, of products of the type described in certain U. S. patents to Henry B. Hass and Byron M. Vanderbilt, particularly in Patents Nos. 2,139,120; 2,139,121; 2,139,122; 2,139,123 and 2,139,124, it being understood that the invention is not limited to the use of these particular aminohydroxy compounds.

According to the Haas and Vanderbilt patents these aminohydroxy compounds may have, as their original starting materials, the nitroparaffins, which, in turn, may be produced from low cost waste gases from the oil fields. Such nitroparaffins may be produced by vapor phase nitration of paraffins and have the general formula $RNO_2$. According to the Hass and Vanderbilt patents the nitroparaffins may be reacted with aldehydes, such as formaldehyde, paraldehyde, etc., to produce nitrohydroxy compounds, and these compounds may then in turn be reduced with hydrogen in the presence of a nickel catalyst to form aminohydroxy compounds. A number of these aminohydroxy compounds are now commercially available, and in accordance with our invention may be employed in the preparation of various useful products, though obviously the invention is not confined to the use of the particular aminohydroxy compounds disclosed in the Hass and Vanderbilt patents.

In general we have found that aminohydroxy compounds may be reacted with phosgene or diethyl carbonate to form simple urethanes, and by elimination of a second mol of $C_2H_5OH$, they may be used to form the cyclic urethane, a five-membered ring, a heterocyclic compound. From the aminohydroxy compounds, the simple urethanes and the cyclic urethanes, we are able to form esters by esterification with organic acids. Several of these products are described by way of illustration in specific Examples 3, 4 and 5 under the designations T-812, T-812-2, and T-812-3. We have found these compounds to be especially good as emulsifying, wetting, and dispersing agents. Inasmuch as these compounds are valuable as inhibitors for anti-skinning, as anti-oxidants and anti-rusting agents, a number of representative compounds will be described by way of illustration, together with information as to their properties and uses. Specific emulsions which owe improved stability to the use of these compounds will also be described. Furthermore these aminohydroxy compounds, the simple and cyclic urethanes and their derivatives, when used as ingredients of synthetic resins, produce new and useful products, some of which are included by way of illustration in the specific examples.

The aminohydroxy compounds, the simple urethanes, and the cyclic urethanes may be used to etherify dimethylolurea. Moreover, the etherification product of dimethylolurea may be reacted with ROH to give the monoetherification products. Also, the etherified dimethylolurea may be reacted with various organic acids, particularly the oil fatty acids, to produce two types of compounds, (1) in which organic acids react with the methylol group of the dimethylolurea, and (2) in which organic acids are used to esterify the aminohydroxy compounds, the simple urethanes, the cyclic urethanes, or their etherification products.

These urea-formaldehyde etherified or esterified products are extremely useful because of their high viscosity and oil esterification properties and because of their ability to react with oily type alcohols in the etherification reaction.

The aminohydroxy compounds, the simple urethanes, and the cyclic urethanes may be used to replace part of the polyhydric alcohol in alkyd-like resins and resins akin to ester gums and thereby produce a harder product. Specific examples are given in this specification by way of illustration in order to show the beneficial role which these compounds play in making new and improved alkyd resins and other resins.

Furthermore, the aminohydroxy derivatives behave similarly to phenol alcohols, and, may be used in the modification of the concentrated phenolic resins employed in the paint and varnish industry, and also as ingredients of the modified phenolic resins used in the same industry, and in other phenolic resins, such as those used in molding plastics. The behavior of aminohydroxy compounds, the simple urethanes, the cyclic urethanes and their derivatives in the phenol formaldehyde reaction, either as partial or total substitutes for phenol alcohol has been studied, and we have found that the incorporation of such products is particularly useful in phenolic resins, and the resulting introduction of nitrogen into these bodies is found to improve the toughness and color retention of the product. The use of these aminohydroxy compounds, simple urethanes, cyclic urethanes and their derivatives in the production of resinous products is very wide in its scope. We find that by their use glycerol may be partially or totally replaced in the formation of "ester gum-like" resins from alkylolamines and rosin, which is highly advantageous because of the resulting increase in melting point, and increase in hardness and toughness.

We have found that, in the case of alkyd resins, these aminohydroxy compounds, cyclic and simple urethanes and their derivatives, can be used to replace the polyhydric alcohol at least in part and act as hardening agents for the alkyd in somewhat the same way as the urea-formaldehyde resins may act as a hardening agent for an alkyd resin, but the present invention possesses the advantage that the whole compound may be prepared as one homogeneous light-colored resin.

The invention will also be more clearly understood by reference to the accompanying specific examples, which are given by way of illustration only and not by way of limitation.

EXAMPLE 1.—*Preparation of a simple urethane (T–820)*

1050 parts by weight (10 mols) of 2-amino-2-methyl-1,3-propanediol and 1180 parts by weight (10 mols) of diethyl carbonate are weighed into a tared 5 liter flask. This flask is fitted with a 600 mm. air condenser and a thermometer. A tube and a second thermometer are connected at the top of the air condenser; the tube leads to a vertical water cooled reflux condenser; at the bottom, a suitable graduated receiver is placed. The temperature of the reaction mixture is increased from 110–160° C. during the course of the reaction. The top temperature is kept between 65–80° C. until 460 parts by weight (10 mols) of distillate (ethyl alcohol) is removed. The resulting simple urethane is a white crystalline solid which crystallizes from the viscous product in 48–72 hours (melting point 65–75° C.). The yield is 1680 parts by weight which equals 95.5% of the theoretical yield. This compound is useful not only as an anti-oxidant and anti-skinning compound, but also as a resin-forming ingredient as shown by Examples 11, 13, 15 and 16.

EXAMPLE 2.—*Preparation of a cyclic urethane (T–819)*

1050 parts by weight (10 mols) of 2-amino-2-methyl-1,3-propanediol and 1180 parts by weight (10 mols) of diethyl carbonate are placed in the reaction flask of the apparatus described in the preparation of a simple urethane. In this preparation, the top temperature is increased from 60 to 86° C. and the bottom temperature from 110 to 193° C. during the progress of the reaction. The reaction was stopped when 913 parts by weight (approximately 10 mols) of distillate had been collected. The yield was 1229 parts by weight, which is 94% of the theoretical yield. The resulting cyclic urethane was a viscous syrupy mass which crystallized to a white crystalline product in approximately one wek (melting point, 90–93° C.). This compound is useful not only as an anti-oxidant and anti-skinning agent but also important as a resin-forming ingredient as shown by Examples 6, 7, 8, 9, 10, 12 and 14.

EXAMPLE 3.—*Preparation of emulsifying agent #1 (T–812)*

255 parts by weight (0.9 mol) of oleic acid was reacted with 105 parts by weight of 2-amino-2-methyl-1,3-propanediol in an open vessel. The reaction mass becomes clear at 195° C. Heating was continued to 205° C.; the end point was determined when a pill on glass remained clear. The yield was 320 parts by weight, indicating that approximately 2 mols of water had been eliminated during the course of the reaction. The resulting product is slightly viscous and pale straw color, and capable of forming stable emulsions from resin and oils in aqueous media, such as described in Example 17.

EXAMPLE 4.—*Preparation of emulsifying agent #2 (T–812–2)*

177 parts by weight (1.0 mol) of simple urethane described in Example 1 was reacted with 255 parts by weight (0.9 mol) of oleic acid in an open vessel. The reaction mass becomes clear at 165° C., and was held at 190° C. until a pill was clear on glass. The yield of product was 410 parts by weight, indicating that approximately one mol of water had been eliminated during the reaction. The resulting pale, straw-colored product is fairly viscous and partly crystallizes after 1 week at room temperature, but the crystals readily dissolve on slight heating. Stable emulsions may be prepared with this emulsifying agent as described in Example 18.

EXAMPLE 5.—*Preparation of emulsifying agent #3 (T–812–3)*

131 parts by weight (1 mol) of cyclic urethane previously described (Example 2) was reacted with 255 parts by weight (0.9 mol) of oleic acid. The reaction mass became clear at 190° C. and was held at 190° C. until a pill remained clear on glass. The yield of product was 364 parts by weight, indicating that approximately 1 mol of water had been eliminated during the reaction. The resulting product is fairly viscous and pale, straw-colored. This product also maintains an equilibrium between the crystalline and liquid state at room temperature, but becomes completely liquid at temperatures slightly in excess of room temperature (40–60° C.). Stable emulsions may be prepared with this emulsifying agent as described in Example 19.

EXAMPLE 6

290 grams of the cyclic urethane described in Example 2 are reacted with 7½ grams of WG gum rosin in the following manner:

The cyclic urethane and rosin are heated to 104° C. until clear. The reaction is continued for about 3 hours to a maximum temperature of 200° C., resulting in a pale, straw-colored resin having a melting point of 50–54° C., said resin being soluble in alcohol and acetone, and very slightly soluble in water, but insoluble in mineral spirits and toluol. This resin strongly resembles a concentrated phenolic resin made from the condensation of phenol di-alcohols, the rosin, in this case, acting principally as a catalyst. This resin is particularly useful in making water-resistant spar varnishes, and has the advantage over the concentrated phenolic resins in that it does not have discoloration caused by ultraviolet light.

EXAMPLE 7

A modified phenolic resin is prepared as follows:

195 parts of cyclic urethane described in Example 2 and 195 parts of a paratertiary butyl phenol di-alcohol, prepared from paratertiary butyl phenol and formaldehyde, are reacted with 7½ parts by weight of WW gum rosin, which serves as a catalyst. These ingredients are reacted for 3 hours at 110° C., resulting in a resin which has a melting point of 75–80° C. and has great heat-hardening properties when incorporated with oil to form super-spar varnishes. This does not have as much sensitivity toward yellowing, due to ultraviolet light as the ordinary concentrated phenolic resins made from paratertiary butyl phenol.

EXAMPLE 8

An oily alkylated urea-formaldehyde resin is prepared as follows:

120 parts of freshly prepared dimethylolurea and 24 parts of cyclic urethane (described in Example 2) are mixed together and heated to approximately 100° C. and held until clear. The clearing is caused by evaporation of moisture from the dimethylolurea and the interaction of the two ingredients. At this stage 65 parts of octyl alcohol are introduced and sufficient orthophosphoric acid to bring the pH of the total system to 5.5. Temperature is gradually increased to 130° C. very slowly on account of foaming due to the reaction and evolution of water. The reaction is finally carried out, however, at 140–150° C. to attain mineral spirits solubility. A very pale, straw-colored resinous solution, soluble in mineral spirits, results.

EXAMPLE 9

120 parts of dimethylolurea and 24 parts of cyclic urethane (described in Example 2) are heated to 100° C. and held until clear, i. e., until the moisture, included in the dimethylolurea, and the moisture from its reaction are driven off. At this point 140 parts of castor oil were added and the temperature gradually raised over a period of 3 hours to 140° C. and the result was a light-colored, very flexible oil-modified urea-formaldehyde resin, soluble in toluol. The amount of flexibility required may be adjusted by variations in the additions of the amount of castor oil employed. This resin, produced by fusion, is very useful as a resin plasticizer for lacquers in combination with nitrocellulose and other derivatives, and is good as a plasticizer for brittle alkyd resins, phenolic resins, and the like.

EXAMPLE 10

148 parts by weight of phthalic anhydride and 150 parts by weight of cyclic urethane (as in Example 2) were heated gradually up to 210° C. in 1 hour, and a light-colored, transparent resin resulted, having an acid number of 44 and a melting range of 34–44° C. This resin was not heat-convertible, and further heating at 210° C. tended to darken the resin to a color of F to G on the Rosin Standards of the U. S. Department of Agriculture. The resin was soluble in alcohol, acetone, and in butyl acetate.

EXAMPLE 11

148 parts by weight of phthalic anhydride and 180 parts by weight of the simple urethane (described in Example 1) were heated gradually up to 210° C. A heat non-convertible light-colored resin resulted after holding at 210° C. for 1 hour, and the acid number went down to 11.5. This resin was soluble in alcohol, acetone, and butyl acetate.

EXAMLPE 12

20 parts by weight of the cyclic urethane (described in Example 2) and 30 parts by weight of phthalic anhydride were heated to a temperature of 180–200° C., at which temperature a resin of very pale straw-color was formed, there being no violent reaction on the up-heat. A hard, tough, transparent resin resulted which is heat non-convertible, having a melting point of 60–70° C. This resin is useful as an adhesive.

EXAMPLE 13

20 parts by weight of simple urethane (described in Example 1) are heated with 30 parts of phthalic anhydride and taken up to 180–200° C. in the course of 1 hour. The color of the resinous product is somewhat paler than that described in Example 12, the present product being a very pale straw color, and after heating for 30 minutes, the resin is not so hard as that in Example 12, having a softening point of around 45° C. This resin, as well as the resin in Example 12, is of value in pale colored varnishes, but also is useful when modified with various substances such as fatty acids, fatty alcohols, and other acids and amines.

EXAMPLE 14

20 parts by weight of the cyclic urethane (described in Example 2) and 20 parts by weight of succinic acid were heated up to 170–185° C. in the course of 1 hour and held at that temperature for 30 minutes. A very pale colored resin resulted upon this heating, which was closer in color to Example 13 than to Example 12, but differs in possessing a slight fluorescence. This resin, however, was never advanced beyond the point of being a good thick jelly-like balsam. On account of its pale color, adhesiveness, and miscibility with materials commonly used in coatings, it is of particular value as a resin plasticizer.

EXAMPLE 15

20 parts by weight of the simple urethane (described in Example 1) and 20 parts by weight of succinic acid were heated up to 170–185° C. in the course of 1 hour and held there for 30 minutes in addition. This resulted in an exceptionally pale colored, practically water-white resinous balsam which is extremely sticky and capable of plasticizing urea-formaldehyde resins which are to be used in white baking refrigerator enamels without discoloring them. An additional point in favor of this water-white resinous balsam-plasticizer is that the odor is not only not objectionable, but rather pleasing. Urea-formaldehyde resins, when modified with this resin, appear to be much more satisfactory than the urea-formaldehyde resins modified in accordance with U. S. Patent No. 2,109,291.

EXAMPLE 16

20 parts by weight of the simple urethane (de-

...olored, ... balsam re-

...ation of an emulsion from ...mulsifying agent No. 1 (T-812 de-...d in Example 3)

400 parts by weight of water were h... 30° C., 22 parts by weight of muri... added to the water under agi... by weight of ammoni... ammonia conta... being m...

... in the ...

EXAMPLE ...

...paint, ...mulsion

The same ... amplo...

However, one of the greatest obstacles to the progress of alkyd resin emulsions has been package stability. Either the emulsifying agents have not been sufficiently good, or the protein (casein) stabilizer has not been protected sufficiently against hydrolysis. The disadvantages of prior emulsifying agents are largely overcome according to the present invention.

We claim:

1. A process which comprises reacting 2-amino-2-methyl-1,3-propanediol with diethyl carbonate to form a urethane.

2. A process which comprises reacting 2-amino-2-methyl-1,3-propanediol with diethyl carbonate to form a simple urethane and continuing the reaction until a cyclic urethane is formed by the elimination of $C_2H_5OH$.

3. A simple urethane formed by the reaction of 2-amino-2-methyl-1,3-propanediol and diethylcarbonate, comprising a white crystalline solid having a melting point of 65–75° C., said compound being useful as an anti-oxidant, an anti-skinning agent, and as a resin-forming ingredient.

4. A cyclic urethane formed by the elimination of $C_2H_5OH$ from a simple urethane produced by reacting 2-amino-2-methyl-1,3-propanediol and diethyl carbonate, and comprising a white crystalline product having a melting point of 90–98° C., and being useful as an anti-oxidant, an anti-skinning agent, and as a resin-forming ingredient.

THEODORE S. HODGINS.
ALMON G. HOVEY.